US012517489B2

(12) United States Patent
Tajima

(10) Patent No.: US 12,517,489 B2
(45) Date of Patent: Jan. 6, 2026

(54) CONTROL DEVICE AND CONTROL METHOD FOR MACHINE TOOL, AND SLAVE SHAFT CONTROL DEVICE

(71) Applicant: FANUC CORPORATION, Yamanashi (JP)

(72) Inventor: Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 437 days.

(21) Appl. No.: 18/008,819

(22) PCT Filed: Jul. 5, 2021

(86) PCT No.: PCT/JP2021/025250
§ 371 (c)(1),
(2) Date: Dec. 7, 2022

(87) PCT Pub. No.: WO2022/009822
PCT Pub. Date: Jan. 13, 2022

(65) Prior Publication Data
US 2023/0229135 A1 Jul. 20, 2023

(30) Foreign Application Priority Data
Jul. 10, 2020 (JP) .................................. 2020-119000

(51) Int. Cl.
*G05B 19/402* (2006.01)
(52) U.S. Cl.
CPC .. *G05B 19/402* (2013.01); *G05B 2219/50047* (2013.01)
(58) Field of Classification Search
CPC ........ G05B 19/402; G05B 2219/50047; G05B 2219/50225; G05B 19/404; G05B 19/19;
(Continued)

(56) References Cited

U.S. PATENT DOCUMENTS 5,475,291 A * 12/1995 Yoshida ............... G05B 19/409
318/632
5,780,989 A * 7/1998 Matsumoto ............. H02P 23/16
318/632
(Continued)

FOREIGN PATENT DOCUMENTS

CN 110635739 A 12/2019
EP 3211829 B1 * 8/2021 ......... G05B 23/0213
(Continued)

OTHER PUBLICATIONS

International Search Report issued Sep. 21, 2021, in International (PCT) Application No. PCT/JP2021/025250, with English translation.
(Continued)

*Primary Examiner* — Yongjia Pan
(74) *Attorney, Agent, or Firm* — Wenderoth, Lind & Ponack, L.L.P.

(57) ABSTRACT

A control device has a master shaft control unit that controls rotation of a master shaft, a slave shaft control unit that controls feeding of a slave shaft, and a numerical value control unit including a master shaft command unit that outputs a first inversion command to the master shaft control unit, a slave shaft command unit that, based on feedback information from the master shaft, outputs a second inversion command that follows the feedback information to the slave shaft control unit, and a prior inversion command unit that outputs a prior inversion command to the slave shaft control unit prior to the output of the first inversion command.

5 Claims, 5 Drawing Sheets

(58) Field of Classification Search
CPC .......................... G05B 19/182; G05B 19/416;
G05B 19/4015; G05B 19/40937; G05B
2219/49198; G05B 2219/50218; G05B
2219/50297; G05B 2219/33078; G05B
2219/35408; G05B 2219/50057; B23G
1/16; B23B 1/00; B23Q 15/14; B23Q
15/26
See application file for complete search history.

(56) References Cited

U.S. PATENT DOCUMENTS

| | | | | |
|---|---|---|---|---|
| 10,437,224 B2* | 10/2019 | Shimizu | | G05B 19/404 |
| 11,787,037 B2* | 10/2023 | Sakaino | | B25J 9/1697 |
| | | | | 700/253 |
| 2003/0065419 A1* | 4/2003 | Fujishima | | B23Q 23/00 |
| | | | | 700/193 |
| 2004/0240981 A1* | 12/2004 | Dothan | | B65G 61/00 |
| | | | | 414/795.4 |
| 2005/0168178 A1* | 8/2005 | Toyozawa | | G05B 19/19 |
| | | | | 318/68 |
| 2009/0140684 A1* | 6/2009 | Otsuki | | G05B 19/404 |
| | | | | 318/572 |
| 2010/0207567 A1* | 8/2010 | Mori | | B23Q 17/22 |
| | | | | 318/632 |
| 2013/0134919 A1* | 5/2013 | Takayama | | G05B 19/416 |
| | | | | 318/625 |
| 2013/0173046 A1 | 7/2013 | Kawana et al. | | |
| 2016/0089760 A1* | 3/2016 | Asano | | G05B 19/404 |
| | | | | 700/160 |
| 2017/0091667 A1* | 3/2017 | Yukawa | | G06N 3/042 |
| 2018/0246492 A1* | 8/2018 | Ido | | G05B 19/404 |
| 2019/0025792 A1* | 1/2019 | Kumamoto | | G05B 19/237 |
| 2019/0086900 A1* | 3/2019 | Fujii | | G05D 3/00 |
| 2019/0163161 A1* | 5/2019 | Sonoda | | G05B 13/0265 |

FOREIGN PATENT DOCUMENTS

| | | |
|---|---|---|
| JP | 63-245325 | 10/1988 |
| JP | H05-080824 A | 4/1993 |
| JP | 2629729 | 7/1997 |
| JP | 2003-140751 A | 5/2003 |
| JP | 2003-181722 | 7/2003 |
| JP | 2007-042068 | 2/2007 |
| JP | 2013-035095 | 2/2013 |
| WO | 2017/221380 | 12/2017 |
| WO | WO-2021075019 A1 * | 4/2021 |

OTHER PUBLICATIONS

Mechanical Science and Technology for Aerospace Engineering, vol. 29, No. 3, Mar. 15, 2010, Yang Xin'gang, Huang Yumei, Shi Wenhao, Ma Xiongfeng, Zhang Chun, "Development on a Measuring System for Circular Movement Errors of Rotary Feed Axis", p. 369-372, P378, with Machine translation, 15 pages.

2012 12th IEEE International Conference on Nanotechnology (IEEE—Nano), Oct. 4, 2012, Ding Jianjun et al., "Study on the influence rules of static mechanical errors in four-linkage precision measuring instrument and the realization of real-time error correction with computer-aided modeling method", p. 1-4, 4 pages.

* cited by examiner

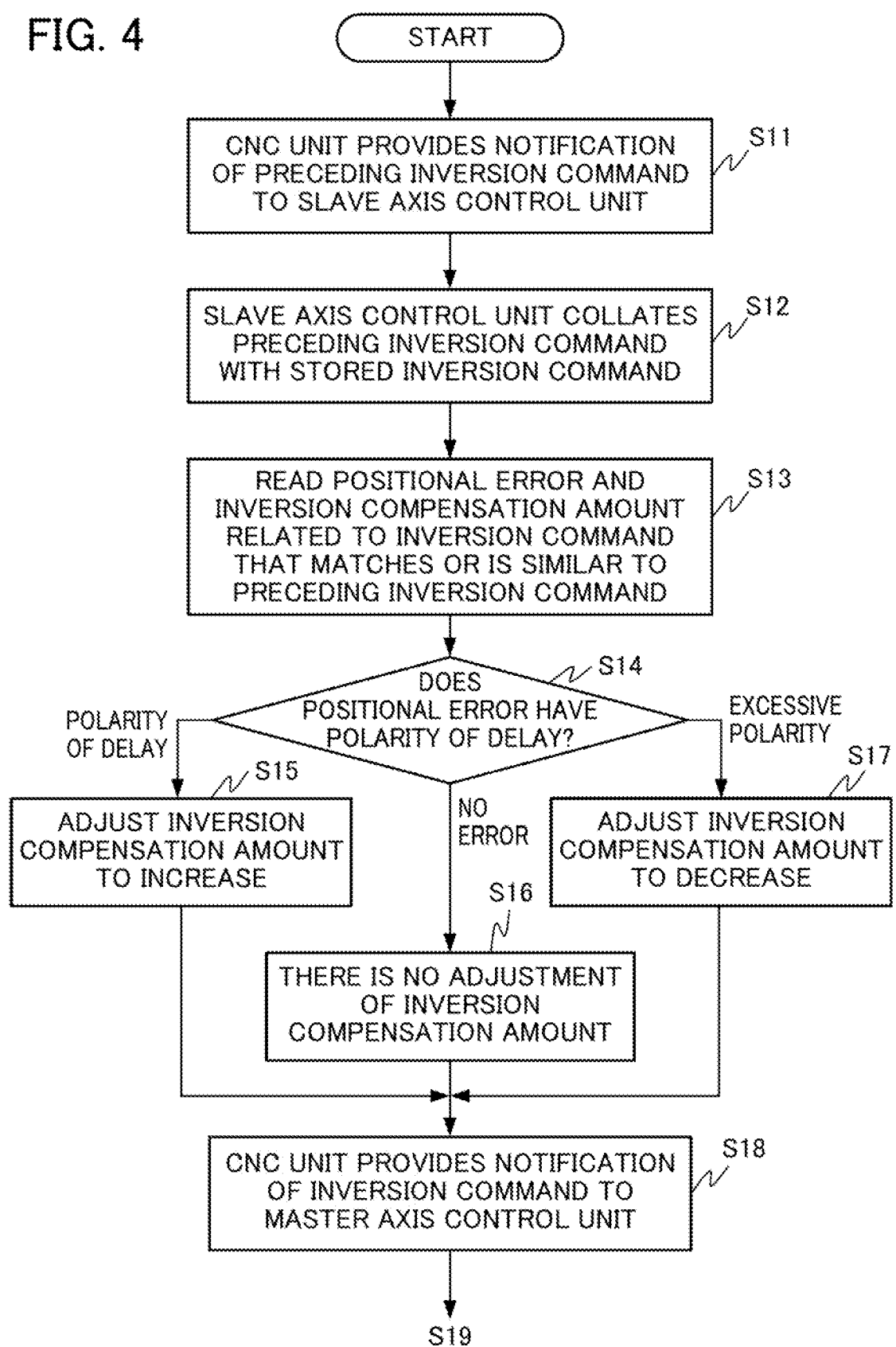

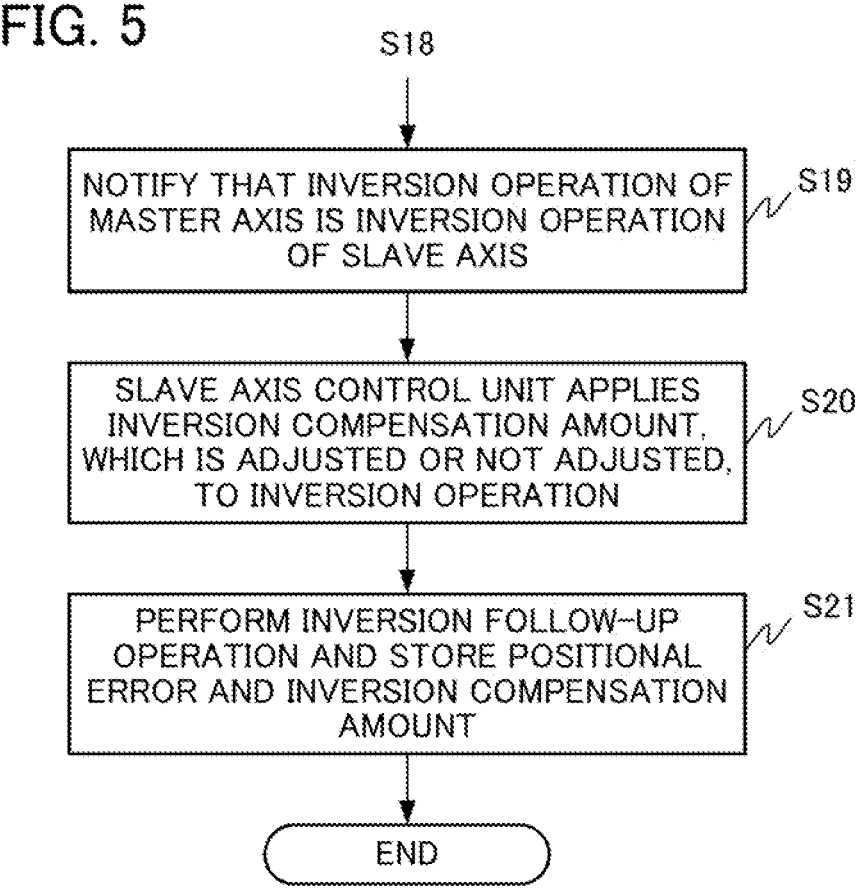

CONTROL DEVICE AND CONTROL METHOD FOR MACHINE TOOL, AND SLAVE SHAFT CONTROL DEVICE

TECHNICAL FIELD

The present invention relates to a controller for a machine tool, a control method, and a slave axis controller.

BACKGROUND ART

A device for controlling a tapping operation of a machine tool to which a numerical controller is applied is disclosed in Patent Document 1. The numerical controller (hereinafter, referred to as NC device) generates a feed command and a rotation command in accordance with a pitch of a screw to be machined, detects a rotation amount of a spindle, and drives a feed motor according to the detected rotation amount.

Specifically, the device disclosed in Patent Document 1 is a screw machining device that includes a rotation position detection means for detecting a rotation position of a spindle and a feed position detection means for detecting a feed position of a machine, and performs the tapping operation by actuating a rotary motor for rotating the spindle and a feed motor for feeding in synchronization with each other. The screw machining device includes: a rotation error computation means for computing a rotation error between a rotation command value and the detected rotation position of the spindle; a rotation drive means for driving the rotary motor according to the rotation error; a feed command value computation means for calculating a rotation speed and acceleration and computing a corresponding feed command value based on a screw pitch from the calculated value; a feed compensation value computation means for computing the corresponding feed compensation value based on the screw pitch from the detected rotation position of the spindle; a feed error computation means for computing a feed error between the feed compensation value and the detected feed amount of the machine; a compensation means for compensating the feed command value by the feed error; and a feed drive means for driving the feed motor according to the feed command value compensated by the compensation means.

Patent Document 1: Japanese Patent No. 2629729

DISCLOSURE OF THE INVENTION

Problems to be Solved by the Invention

In a controller for a machine tool including axes that perform synchronous operation in a master/slave manner, a follow-up delay of a slave axis such as a feed axis is likely to occur with respect to a master axis such as a spindle, and in particular, a follow-up delay of the slave axis is likely to occur with respect to the master axis during an acceleration operation immediately after inversion.

Therefore, for the controller for the machine tool including the axes that perform the synchronous operation in the master/slave manner, it is desirable to improve followability of the slave axis to the master axis and to improve synchronization accuracy.

Means for Solving the Problems (1) A first aspect of the present disclosure is directed to a controller for a machine tool including a master axis and a slave axis that perform synchronous operation in a master/slave manner, the controller including: a master axis control unit that controls a rotation operation of the master axis; a slave axis control unit that controls a feed operation of the slave axis; and a numerical control unit including a master axis command unit that outputs a first inversion command to the master axis control unit based on a machining program, a slave axis command unit that outputs, based on the machining program and feedback information from the master axis, a second inversion command following up the feedback information to the slave axis control unit, and a preceding inversion command unit that outputs a preceding inversion command to the slave axis control unit before the first inversion command is output to the master axis control unit. The slave axis control unit includes a storage unit that stores the second inversion command, a follow-up result for the second inversion command, and an inversion compensation amount for the second inversion command in association with each other, and an inversion compensation amount calculation unit that obtains an inversion compensation amount for the second inversion command output after the preceding inversion command is output, from the follow-up result and the inversion compensation amount associated with the second inversion command specified based on the preceding inversion command and stored in the storage unit.

(2) A second aspect of the present disclosure is directed to a control method for a controller for a machine tool including a master axis and a slave axis that perform synchronous operation in a master/slave manner. The controller includes: a master axis control unit that controls a rotation operation of the master axis; a slave axis control unit that controls a feed operation of the slave axis; and a numerical control unit that outputs a first inversion command to the master axis control unit based on a machining program and outputs, based on the machining program and feedback information from the master axis, a second inversion command following up the feedback information to the slave axis control unit. The control method includes: causing the slave axis control unit to make a storage unit store the second inversion command, a follow-up result for the second inversion command, and an inversion compensation amount for the second inversion command in association with each other; causing the numerical control unit to output a preceding inversion command to the slave axis control unit before the first inversion command is output to the master axis control unit, after the second inversion command, the follow-up result, and the inversion compensation amount are stored in the storage unit; and causing the slave axis control unit to obtain an inversion compensation amount for the second inversion command output after the preceding inversion command is output, from the follow-up result and the inversion compensation amount associated with the second inversion command specified based on the preceding inversion command and stored in the storage unit.

(3) A third aspect of the present disclosure is directed to a slave axis controller functioning as a slave axis control unit of a controller. The controller includes: a master axis control unit that controls a rotation operation of a master axis of a machine tool; the slave axis control unit that controls a feed operation of a slave axis of the machine tool; and a numerical control unit including a master axis command unit that outputs a first inversion command to the master axis control unit based on a machining program, a slave axis command unit that outputs, based on the machining program and feedback information from the master axis, a second inversion command following up the feedback information to the slave axis control unit, and a preceding inversion command unit that outputs a preceding inversion command to the slave axis control unit before the first inversion command is output to the master axis control unit, the slave axis controller including: a storage unit that stores the second inversion command, a follow-up result for the second inversion command, and an inversion compensation amount for the second inversion command in association with each other; and an inversion compensation amount calculation unit that obtains an inversion compensation amount for the second inversion command output after the preceding inversion command is output, from the follow-up result and the inversion compensation amount associated with the second inversion command specified based on the preceding inversion command and stored in the storage unit.

Effects of the Invention

According to the aspects of the present disclosure, it is possible to improve followability of the slave axis with respect to the master axis and to improve the synchronization accuracy.

BRIEF DESCRIPTION OF THE DRAWINGS

FIG. 4 is a flowchart showing a part of an operation of the controller according to the present embodiment; and FIG. 5 is a flowchart showing another part of the operation of the controller according to the present embodiment.

PREFERRED MODE FOR CARRYING OUT THE INVENTION

Figure 1:
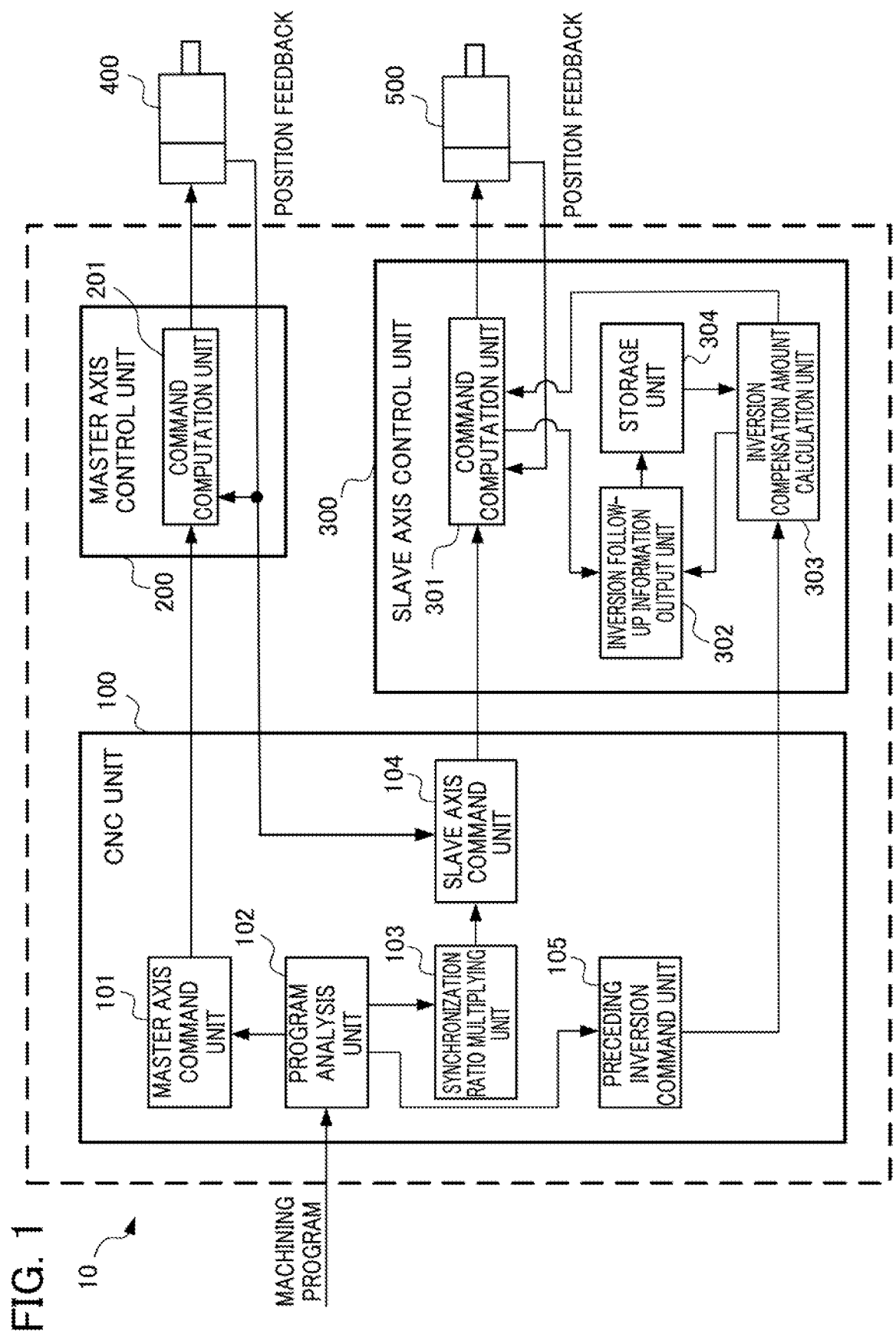
FIG. 1 is a block diagram showing a first configuration example of a controller for a machine tool according to an embodiment of the present disclosure.

Hereinafter, an embodiment of the present invention will be described in detail with reference to the drawings. FIG. 1 is a block diagram showing a first configuration example of a controller for a machine tool according to the embodiment of the present disclosure. As shown in FIG. 1, a controller 10 of a machine tool 10 includes a computerized numerical control unit 100, a master axis control unit 200, and a slave axis control unit 300. The master axis control unit 200 drives a motor 400 for a master axis of the machine tool, and the slave axis control unit 300 drives a motor 500 for a slave axis of the machine tool. In the controller 10, the computerized numerical control unit (hereinafter, referred to as a CNC unit) 100 controls, based on a machining program, the master axis control unit 200 and the slave axis control unit 300, and the master axis control unit 200 and the slave axis control unit 300 drive the motor 400 and the motor 500, respectively, and perform machining. The machine tool to be controlled by the controller 10 is, for example, a 3-axis machine. The machine tool is not limited to the 3-axis machine, and may be a 5-axis machine, for example. Since the configuration of the machine tool is already known, only the motors 400 and 500 of the machine tool are shown in FIG. 1, and other components are not shown. The master axis is, for example, a rotatable spindle to which a tool is attached, and includes a motor. The slave axis is, for example, a feed axis for giving a feed operation to a tool for machining a workpiece or to the workpiece, and includes a motor. The numerical control unit includes a CNC unit, and the CNC unit means a numerical control unit that is one of numerical control units for performing numerical control by a computer.

FIG. 1 shows only one slave axis control unit 300 and one motor 500 of the controller 10 that perform synchronous operation in a master/slave manner, but when the machine tool is a 3-axis machine, feed axes serving as slave axes are an X-axis, a Y-axis, and a Z-axis, and control units and motors for controlling the feed axes are provided for the X-axis, the Y-axis, and the Z-axis, respectively.

Figure 2:
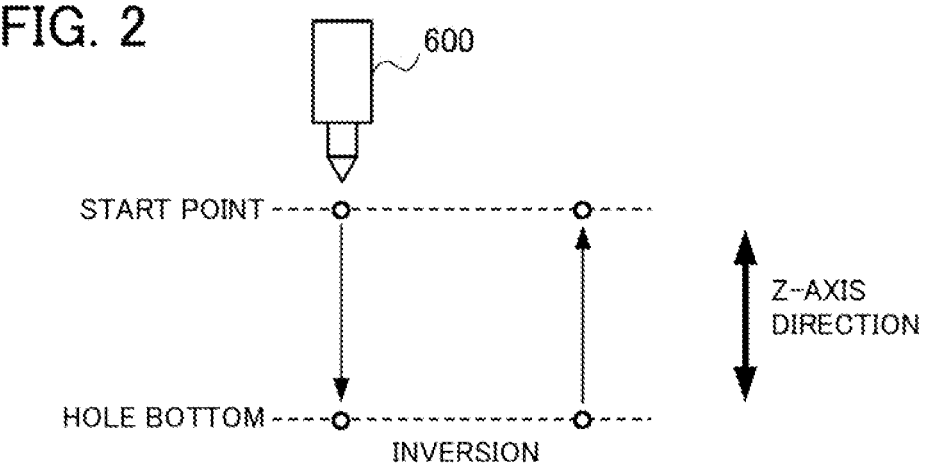
FIG. 2 is an explanatory diagram showing a tapping operation in screw machining in a Z-axis direction according to the present embodiment.

In the following description, it is assumed that the controller 10 controls screw machining that performs synchronous operation in a master/slave manner. FIG. 2 is an explanatory diagram showing a tapping operation in screw machining in the Z-axis direction. The CNC unit 100 of the controller 10 generates a feed command serving as a slave axis command such that a master axis 600 attached with a tapping tool moves to a start point of the screw machining for the workpiece. Then, the CNC unit 100 generates the feed command serving as the slave axis command and a rotation command serving as a master axis command according to a pitch of the screw such that the tapping tool attached to a tip of the master axis 600 reaches a hole bottom of the screw from the start point of the screw machining for the workpiece, a feed direction (Z-axis direction) and a rotation direction are inversed, and the tapping tool moves from the hole bottom of the screw to the start point. The controller 10 controls a rotation of the motor 50 for the slave axis and adjusts the feed amount of the tapping tool, based on the slave axis command and the rotation amount as position feedback information of the motor 400 for the master axis, such that there is no deviation between the feed amount and the rotation amount of the tapping tool attached to the tip of the master axis 600 during inversion. In this manner, the controller 10 controls the motor 400 and the motor 500 in synchronization.

Each of the components of the controller 10 will be described below. In the following description, a case will be described in which the master axis 600 does not move in the X-axis direction and the Y-axis direction and the controller 10 performs the screw machining in the Z-axis direction.

<CNC Unit>

As shown in FIG. 1, the CNC unit 100 includes a master axis command unit 101, a program analysis unit 102, a synchronization ratio multiplying unit 103, a slave axis command unit 104, and a preceding inversion command unit 105.

The master axis command unit 101 generates a master axis command for commanding the rotation of the master axis based on a first movement command for commanding the rotation of the master axis, which is output from the program analysis unit 102, and outputs the master axis command to a command computation unit 201 of the master axis control unit 200. The master axis command includes a polarity (clockwise direction or anticlockwise direction) of the rotation direction of the master axis 600, and includes an inversion command (to be a first inversion command) including information on a rotation speed and/or acceleration.

The program analysis unit 102 sequentially reads and analyzes blocks retaining rotation data and movement data on the Z-axis of a spindle from a machining program (NC data) created by a CAM (Computer Aided Manufacturing) device. Then, the program analysis unit 102 calculates, based on the analysis result, a first movement command for commanding the rotation of the master axis and a second movement command for commanding the movement on the Z-axis serving as a slave axis, analyzes the first movement command and the second movement command, and outputs the analysis result to the master axis command unit 101 and the synchronization ratio multiplying unit 103. The program analysis unit 102 outputs a movement command, which is included in the first movement command for commanding the rotation of the master axis, for commanding the rotation of the master axis during inversion to the preceding inversion command unit 105, before outputting the first movement command to the master axis command unit 101.

The synchronization ratio multiplying unit 103 outputs the result obtained by multiplying the second movement command by a synchronization ratio to the slave axis command unit 104. In the machining of the machine tool, there is a case where the movement of the slave axis is required to follow up the movement of the master axis at ratios other than a ratio of 1:1. The synchronization ratio multiplying unit 103 multiplies the second movement command by using such a ratio as a "synchronization ratio". The synchronization ratio is specified in a manner of being described in a program by the user, or is specified as a parameter of the CNC unit 100 in advance.

The slave axis command unit 104 generates a slave axis command for commanding the movement on the Z-axis based on the second movement command multiplied by the synchronization ratio output from the synchronization ratio multiplying unit 103 and the position feedback information as a position detection amount of the motor 400, and outputs the slave axis command to a command computation unit 301 of the slave axis control unit 300 on the Z-axis. The slave axis command includes a polarity (clockwise direction or anticlockwise direction) of the movement direction of the slave axis, and includes an inversion command (to be a second inversion command) including information on a rotation speed and/or acceleration. Since the slave axis command is generated using the position feedback information that is the position detection amount of the motor 400, the machine tool can be controlled so as to reduce the deviation between the feed amount and the rotation amount of the tapping tool attached to the tip of the master axis 600.

Upon receiving the movement command for commanding the rotation of the master axis during inversion from the program analysis unit 102, the preceding inversion command unit 105 sends a preceding inversion command to the slave axis control unit 300. The preceding inversion command includes a polarity (clockwise direction or anticlockwise direction) of the master axis 600, and includes information on a rotation speed and/or acceleration. As described above, since the program analysis unit 102 outputs the movement command for commanding the rotation of the master axis during inversion to the preceding inversion command unit 105, before outputting the first movement command to the master axis command unit 101, the preceding inversion command unit 105 can output the preceding inversion command to the slave axis control unit 300 before the master axis command unit 101 outputs the master axis command including the inversion command.

<Master Axis Control Unit>

The master axis control unit 200 includes the command computation unit 201. When a position command is input as the master axis command from the master axis command unit 101 of the CNC unit 100, the command computation unit 201 obtains a difference (positional error) between the position command and the position feedback information from the motor 400. The command computation unit 201 obtains a speed command based on the obtained positional error, and obtains a torque command based on the obtained speed command. Further, the command computation unit 201 obtains a current command based on the obtained torque command and controls the rotation operation of the motor 400. The position feedback information is output to the slave axis command unit 104. Since the configuration and the operation of the command computation unit 201 are already known, components of the command computation unit 201 are not shown and described in detail.

<Slave Axis Control Unit>

Figure 3:
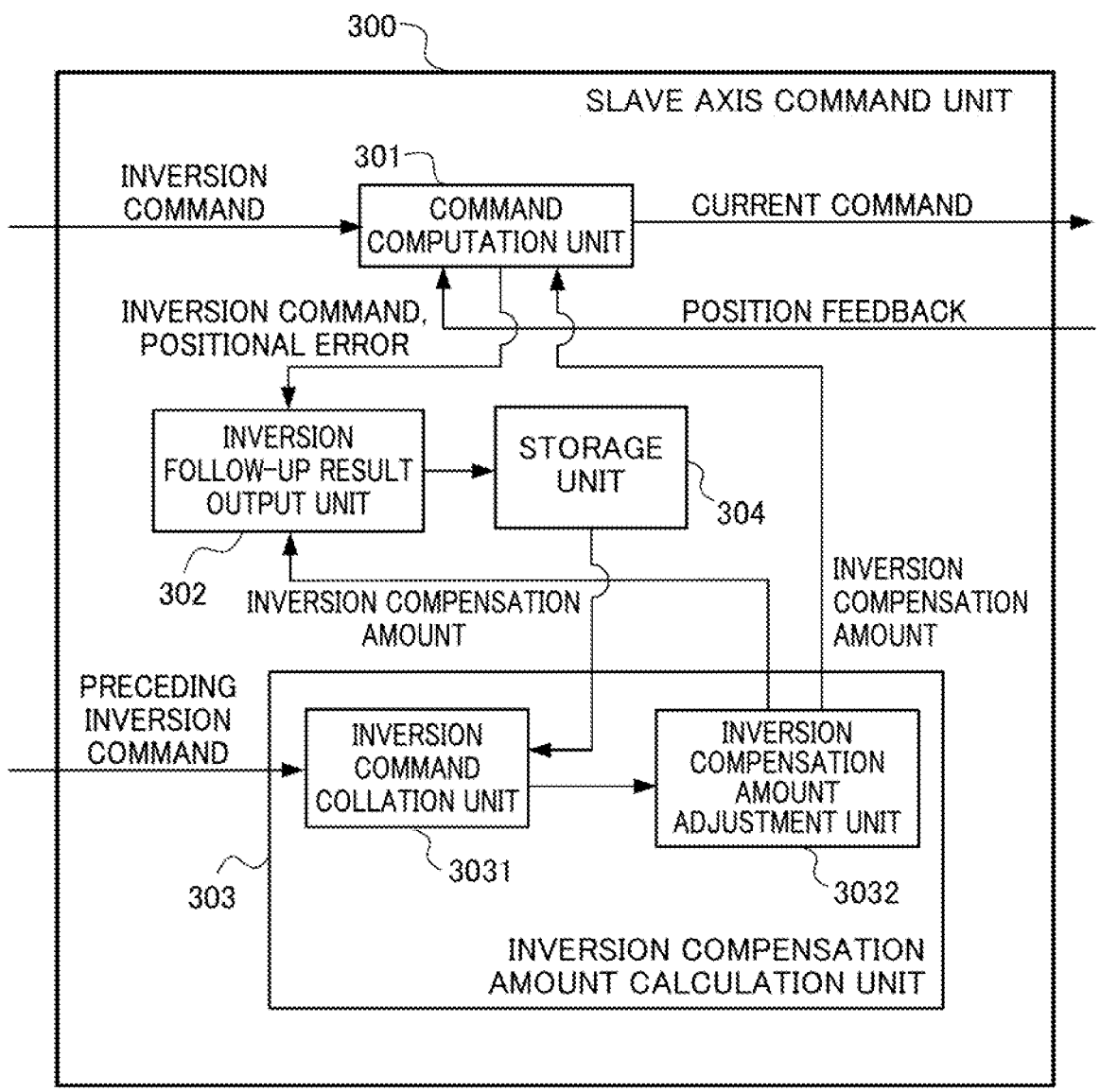
FIG. 3 is a block diagram showing a configuration of a slave axis control unit according to the present embodiment.

The slave axis control unit 300 includes a command computation unit 301, an inversion follow-up information output unit 302, an inversion compensation amount calculation unit 303, and a storage unit 304. The slave axis control unit 300 becomes a slave axis controller. FIG. 3 is a block diagram showing a configuration of a slave axis control unit.

The command computation unit 301 obtains a difference (positional error) between the position command and the position feedback information from the motor 500 when the position command is input as the slave axis command from the slave axis command unit 104 of the CNC unit 100. The command computation unit 301 obtains a speed command based on the obtained positional error, and obtains a torque command based on the obtained speed command. Further, the command computation unit 301 obtains a current command based on the obtained torque command and controls the rotation operation of the motor 500. Since the configuration and the operation of the command computation unit 301 are already known, components of the command computation unit 301 are not shown and described in detail.

The inversion follow-up information output unit 302 acquires, from the inversion compensation amount calculation unit 303, an inversion compensation amount calculated based on the preceding inversion command. Further, the inversion follow-up information output unit 302 acquires, from the command computation unit 301, the inversion command and the positional error resulting from an inversion follow-up based on the inversion command. The inversion follow-up information output unit 302 can detect the inversion of the polarity of the slave axis command input to the command computation unit 301 to obtain the time of inversion, and detect information such as a speed and/or acceleration at the time of inversion. Then, the inversion follow-up information output unit 302 stores the inversion command, the positional error, and the inversion compensation amount in the storage unit 304 in association with each other. The positional error and the inversion compensation amount are inversion follow-up information. Information such as a speed or acceleration is stored as the inversion command. The inversion follow-up result is not limited to the positional error, and other information, for example, a speed error may be used. The speed error is a difference between the speed command and the differential value of the position feedback information. The storage unit 304 stores a set of information of a past inversion command before the preceding inversion command is input to the slave axis control unit 300, the inversion compensation amount for the past inversion command, and the positional error resulting from the inversion follow-up. For example, the storage unit 304 stores n (n being a natural number) sets of information of the inversion command, the inversion compensation amount, and the positional error.

As shown in FIG. 3, the inversion compensation amount calculation unit 303 includes an inversion command collation unit 3031 and an inversion compensation amount adjustment unit 3033. Upon receiving the preceding inversion command from the preceding inversion command unit 105, the inversion command collation unit 3031 collates at least one piece of information of the speed and acceleration at the time of inversion included in the preceding inversion command with at least one piece of information of the speed and acceleration of the inversion command stored in the storage unit 304, and searches for the inversion command closest to the preceding inversion command. Then, the inversion command collation unit 3031 reads the positional error and the inversion compensation amount related to the searched inversion command from the storage unit 304, and outputs the read positional error and inversion compensation amount to the inversion compensation amount adjustment unit 3032. The inversion compensation amount adjustment unit 3032 determines whether the positional error has a polarity of delay, adjusts the inversion compensation amount to increase when the positional error has the polarity of delay, adjusts the inversion compensation amount to decrease when the positional error has an excessive polarity, and outputs the adjusted inversion compensation amount to the command computation unit 301 and the inversion follow-up information output unit 302. A value for adjusting the inversion compensation amount can be determined based on the value of the positional error, or can be set to a predetermined value in advance. The inversion compensation amount input to the command computation unit 301 is applied to compensation of acceleration or torque in the command computation unit 301. The inversion compensation amount input to the command computation unit 301 may be applied to compensation of the position, the positional error, or the speed.

<Motors for Master Axis and Slave Axis>

The motor 400 for the master axis rotates the axis to which the tapping tool is attached. The motor 500 for the slave axis moves the tapping tool or the workpiece in the Z-axis direction. For the movement in the Z-axis direction, a rotating motor and a ball screw may be used, or a linear motor may be used.

The functional blocks included in the controller 10 have been described above. In order to implement these functional blocks, the controller 10 includes a computation processing device such as a CPU (Central Processing Unit). Further, the controller 10 includes not only an auxiliary storage device such as an HDD (Hard Disk Drive) for storing various control programs such as application software or OS (Operating System), but also a main storage device such as a RAM (Random Access Memory) for storing data temporarily required when the computation processing device executes programs.

In the controller 10, the computation processing device reads the application software or the OS from the auxiliary storage device, and performs computation processing based on such application software or OS while deploying the read application software or OS in the main storage device. Further, based on the result of the computation, various hardware included in each device is controlled. Thus, the functional blocks of the present embodiment are implemented. In other words, the present embodiment can be implemented by cooperation of hardware and software.

Next, the operation of the controller 10 will be described using a flowchart. FIGS. 4 and 5 are flowcharts showing the operation of the controller 10. In Step S11, the CNC unit 100 provides a notification of the preceding inversion command to the slave axis control unit 300. The preceding inversion command includes the polarity (clockwise direction or anti-clockwise direction) of the master axis 600, and includes information on the rotation speed and/or acceleration during inversion.

In Step S12, the inversion command collation unit 3031 of the slave axis control unit 300 collates the preceding inversion command with the stored inversion command. The stored inversion command includes information such as the speed and/or acceleration at the time of inversion of the slave axis. In Step S13, the inversion command collation unit 3031 reads the positional error and the inversion compensation amount related to the inversion command in which at least one of the speed and acceleration at the time of inversion of the preceding inversion command matches or is similar to at least one of the speed and acceleration at the time of inversion.

In Step S14, the inversion compensation amount adjustment unit 3032 determines whether there is no positional error, whether the positional error has the polarity of delay, and whether the positional error has the excessive polarity. The inversion compensation amount adjustment unit 3032 adjusts the inversion compensation amount to increase in Step S15 when the positional error has the polarity of delay, uses the inversion compensation amount as it is (there is no adjustment of the inversion compensation amount) in Step S16 when there is no positional error, and adjusts the inversion compensation amount to decreases in Step S17 when the positional error has the excessive polarity.

In Step S18, the CNC unit 100 provide a notification of the inversion command to the master axis control unit 200. In Step S19, the position feedback of the master axis is input to the slave axis command unit 104, the inversion operation of the master axis is reflected in the inversion command of the slave axis, and the inversion command is output from the slave axis command unit 104 to the command computation unit 301 of the slave axis control unit 300.

In Step S20, the slave axis control unit 300 applies the inversion compensation amount, which is adjusted or not adjusted by the inversion compensation amount adjustment unit 3032 in Steps S15 to S17 to the inversion operation in the command computation unit 301. In Step S21, the command computation unit 301 of the slave axis control unit 300 applies the inversion compensation amount to control the motor 500, and performs the inversion follow-up operation of the slave axis with respect to the master axis, and the inversion follow-up information output unit 302 stores the inversion command and the positional error and the inversion compensation amount resulting from the inversion follow-up.

According to the embodiment described above, it is possible to improve followability of the slave axis with respect to the master axis, particularly followability of the acceleration operation immediately after the inversion where the followability of the slave axis tends to deteriorate, thereby improving the synchronization accuracy.

Although each embodiment of the present invention has been described above, all or some of the functions of the controller 10 can be implemented by software. However, the functions of the controller 10 can be implemented by hardware or a combination of software and hardware. Here, the term "implementation by software" means that programs are read and implemented by a computer. When the controller 10 is constituted by hardware, some or all of the components of the controller 10 can be constituted by integrated circuits (ICs), for example, an LSI (Large Scale Integrated circuit), an ASIC (Application Specific Integrated Circuit), a gate array, and an FPGA (Field Programmable Gate Array).

When the controller 10 is implemented by software, according to a control application stored in a first storage unit such as a hard disk device or a ROM, in which the operations shown in FIGS. 4 and 5, for causing the controller 10 to operate is described, information necessary for the computation is stored in a second storage unit such as a RAM, and the CPU executes processing, whereby the operation of the controller 10 can be executed by a program. The control application can be read from computer-readable media, on which a program is recorded, to the first storage unit such as a hard disk.

The computer-readable media include various types of tangible storage media. The computer-readable media include non-transitory computer-readable media. Examples of the computer-readable media include a magnetic recording medium (for example, a hard disk drive), a magneto-optic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM).

The above-described embodiment is a preferred embodiment of the present invention, but the scope of the present invention is not limited to the above-described embodiment, and various modifications are made without departing from the scope of the present invention.

The controller, the control method, and the slave axis controller according to the present disclosure can take various embodiments, including the embodiment described above, having the following configurations.

(1) A controller for a machine tool including a master axis and a slave axis that perform synchronous operation in a master/slave manner, the controller including: a master axis control unit that controls a rotation operation of the master axis; a slave axis control unit that controls a feed operation of the slave axis; and a numerical control unit including a master axis command unit that outputs a first inversion command to the master axis control unit based on a machining program, a slave axis command unit that outputs, based on the machining program and feedback information from the master axis, a second inversion command following up the feedback information to the slave axis control unit, and a preceding inversion command unit that outputs a preceding inversion command to the slave axis control unit before the first inversion command is output to the master axis control unit, the slave axis control unit including a storage unit that stores the second inversion command, a follow-up result for the second inversion command, and an inversion compensation amount for the second inversion command in association with each other, and an inversion compensation amount calculation unit that obtains an inversion compensation amount for the second inversion command output after the preceding inversion command is output, from the follow-up result and the inversion compensation amount associated with the second inversion command specified based on the preceding inversion command and stored in the storage unit.

According to the controller, it is possible to improve followability of the slave axis with respect to the master axis and to improve the synchronization accuracy.

(2) In the controller according to (1) described above, the follow-up result is a positional error that is a difference between a position command output from the slave axis command unit and the feedback information from the slave axis.

(3) In the controller according to (1) or (2) described above, the inversion compensation amount is a compensation amount for acceleration or torque.

(4) A control method for a controller for a machine tool including a master axis and a slave axis that perform synchronous operation in a master/slave manner, the controller including: a master axis control unit that controls a rotation operation of the master axis; a slave axis control unit that controls a feed operation of the slave axis; and a numerical control unit that outputs a first inversion command to the master axis control unit based on a machining program and outputs, based on the machining program and feedback information from the master axis, a second inversion command following up the feedback information to the slave axis control unit. The control method includes: causing the slave axis control unit to make a storage unit store the second inversion command, a follow-up result for the second inversion command, and an inversion compensation amount for the second inversion command in association with each other, causing the numerical control unit to output a preceding inversion command to the slave axis control unit before the first inversion command is output to the master axis control unit, after the second inversion command, the follow-up result, and the inversion compensation amount are stored in the storage unit, and causing the slave axis control unit to obtain an inversion compensation amount for the second inversion command output after the preceding inversion command is output, from the follow-up result and the inversion compensation amount associated with the second inversion command specified based on the preceding inversion command and stored in the storage unit.

According to the control method, it is possible to improve followability of the slave axis with respect to the master axis and to improve the synchronization accuracy.

(5) A slave axis controller functioning as a slave axis control unit of a controller, the controller including: a master axis control unit that controls a rotation operation of a master axis of a machine tool; the slave axis control unit that controls a feed operation of a slave axis of the machine tool; and a numerical control unit including a master axis command unit that outputs a first inversion command to the master axis control unit based on a machining program, a slave axis command unit that outputs, based on the machining program and feedback information from the master axis, a second inversion command following up the feedback information to the slave axis control unit, and a preceding inversion command unit that outputs a preceding inversion command to the slave axis control unit before the first inversion command is output to the master axis control unit. The slave axis controller includes: a storage unit that stores the second inversion command, a follow-up result for the second inversion command, and an inversion compensation amount for the second inversion command in association with each other; and an inversion compensation amount calculation unit that obtains an inversion compensation amount for the second inversion command output after the preceding inversion command is output, from the follow-up result and the inversion compensation amount associated with the second inversion command specified based on the preceding inversion command and stored in the storage unit.

According to the slave axis controller, it is possible to improve followability of the slave axis with respect to the master axis and to improve the synchronization accuracy.

EXPLANATION OF REFERENCE NUMERALS

10: controller
100: CNC unit
101: master axis command unit
102: program analysis unit
103: synchronization ratio multiplying unit
104: slave axis command unit
105: preceding inversion command unit
200: master axis control unit
201: command computation unit
300: slave axis control unit
301: command computation unit
302: inversion follow-up information output unit
303: inversion compensation amount calculation unit
304: storage unit
400: motor for master axis
500: motor for slave axis

The invention claimed is:

1. A controller for a machine tool including a master axis and a slave axis that perform synchronous operation in a master/slave manner, the controller comprising:
a master axis control unit that controls a rotation operation of the master axis;
a slave axis control unit that controls a feed operation of the slave axis; and
a numerical control unit including a master axis command unit that outputs a first inversion command to the master axis control unit based on a machining program, a slave axis command unit that outputs, based on the machining program and feedback information from the master axis, a second inversion command following up the feedback information to the slave axis control unit, and a preceding inversion command unit that outputs a preceding inversion command to the slave axis control unit before the first inversion command is output to the master axis control unit,
the slave axis control unit including
a storage unit that stores, before the preceding inversion command is output, a past second inversion command, a past follow-up result for the past second inversion command, and a past inversion compensation amount for the past second inversion command in association with each other, and
an inversion compensation amount calculation unit that obtains an inversion compensation amount for the second inversion command output after the preceding inversion command is output, from the past follow-up result and the past inversion compensation amount associated with the past second inversion command specified based on the preceding inversion command.

2. The controller according to claim 1, wherein the past follow-up result is a positional error that is a difference between a position command output from the slave axis command unit and a position feedback information from the slave axis.

3. The controller according to claim 1, wherein the inversion compensation amount is a compensation amount for acceleration or torque.

4. A control method for a controller for a machine tool including a master axis and a slave axis that perform synchronous operation in a master/slave manner,
the controller including:
a master axis control unit that controls a rotation operation of the master axis;
a slave axis control unit that controls a feed operation of the slave axis; and
a numerical control unit that outputs a first inversion command to the master axis control unit based on a machining program and outputs, based on the machining program and feedback information from the master axis, a second inversion command following up the feedback information to the slave axis control unit,
the control method comprising:
causing the slave axis control unit to make a storage unit store, before a preceding inversion command is output to the slave axis control unit, a past second inversion command, a past follow-up result for the past second inversion command, and a past inversion compensation amount for the past second inversion command in association with each other;
causing the numerical control unit to output the preceding inversion command to the slave axis control unit before the first inversion command is output to the master axis control unit, after the past second inversion command, the past follow-up result, and the past inversion compensation amount are stored in the storage unit; and
causing the slave axis control unit to obtain an inversion compensation amount for the second inversion command output after the preceding inversion command is output, from the past follow-up result and the past inversion compensation amount associated with the past second inversion command specified based on the preceding inversion command.

5. A slave axis controller functioning as a slave axis control unit of a controller,
the controller including:
a master axis control unit that controls a rotation operation of a master axis of a machine tool;
the slave axis control unit that controls a feed operation of a slave axis of the machine tool; and
a numerical control unit including a master axis command unit that outputs a first inversion command to the master axis control unit based on a machining program, a slave axis command unit that outputs, based on the machining program and feedback information from the master axis, a second inversion command following up the feedback information to the slave axis control unit, and a preceding inversion command unit that outputs a preceding inversion command to the slave axis control unit before the first inversion command is output to the master axis control unit,
the slave axis controller comprising:
a storage unit that stores, before the preceding inversion command is output, a past second inversion command, a past follow-up result for the past second inversion command, and a past inversion compensation amount for the past second inversion command in association with each other; and
an inversion compensation amount calculation unit that obtains an inversion compensation amount for the second inversion command output after the preceding inversion command is output, from the past follow-up result and the past inversion compensation amount associated with the past second inversion command specified based on the preceding inversion command.

\* \* \* \* \*